No. 863,122. PATENTED AUG. 13, 1907.
H. WEBER.
TRUCK.
APPLICATION FILED MAY 14, 1906.

WITNESSES:

Herman Weber,
INVENTOR.

ATTORNEYS

UNITED STATES PATENT OFFICE.

HERMAN WEBER, OF COLORADO SPRINGS, COLORADO.

TRUCK.

No. 863,122.  Specification of Letters Patent.  Patented Aug. 13, 1907.

Application filed May 14, 1906. Serial No. 316,784.

To all whom it may concern:

Be it known that I, HERMAN WEBER, a citizen of the United States, residing at Colorado Springs, in the county of El Paso and State of Colorado, have invented a new and useful Truck, of which the following is a specification.

This invention relates to trucks or turn-tables for handling vehicles of all classes, and is found of especial value in the handling of automobiles in garages or repair shops, and in loading or unloading the same from railway cars.

A further object of the invention is to provide a truck of simple and economical construction, and of sufficient strength to safely support the heaviest vehicle.

A still further object of the invention is to provide a device of this class in which the supporting platform is made of a single piece of metal having a supporting platform dished in order to conform to the contour of the vehicle wheel and safely retain the same in place while the loading end of the platform is extended in the form of an inclined plane having terminal teeth which engage with the floor or other supporting surface during the loading operation, and prevent slipping or sliding of the truck.

A still further object of the invention is to provide a truck or turn table of very light weight, and in which the number of parts is reduced to a minimum, the load receiving platform having extended wings or ears that form parts of the supporting casters.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 1:
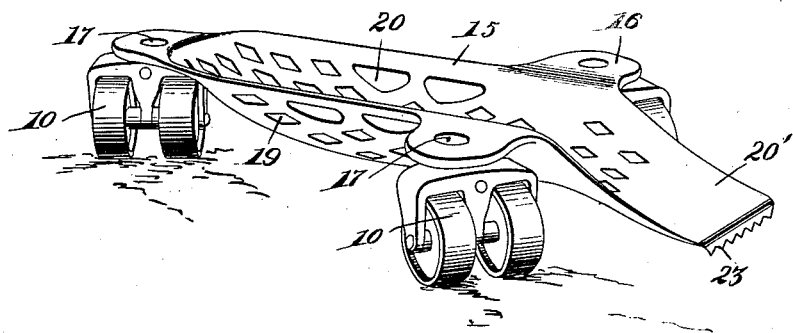
Figure 2:
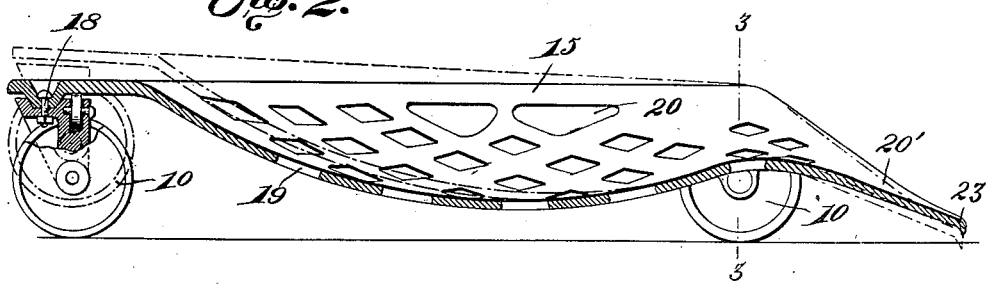
Figure 3:
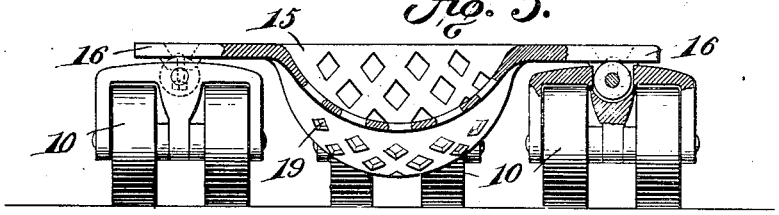

In the accompanying drawings:—Figure 1 is a perspective view of a truck constructed in accordance with the invention. Fig. 2 is a longitudinal sectional elevation of the same. Fig. 3 is a transverse sectional view of the truck on the line 3—3 of Fig. 2.

Similar numerals of reference are employed to indicate corresponding parts throughout the several figures of the drawings.

In carrying out the invention, three or four supporting casters 10 are employed, such casters being of any desired type, but the upper plate or disk of each caster, that is to say, the member which is usually attached to the article to be supported, is removed, and in place of these plates the load receiving platform 15 is provided with extended ears 16 having openings 17, the walls of which are tapered, said openings serving for the passage of pivot bolts 18, on which the wheeled frames of the casters are free to turn in horizontal planes. The load receiving platform 15 is formed of a single sheet of metal which may be stamped, cast or otherwise formed, and the plate is preferably provided with a large number of openings 19 for the purpose of reducing weight, and at the opposite sides are larger openings 20 through which the hand may be inserted when the trucks are to be carried from place to place. The body portion of the platform is curved transversely, being approximately semi-circular in form to correspond in a measure to the cross sectional contour of the treads of automobile wheels, and said platform is further dished or concaved in the direction of its length, so that the wheel when once moved to position will be firmly held, and auxiliary locking devices rendered unnecessary. The dished portion of the platform, or that point where the principal portion of the load is supported, is disposed in a horizontal plane considerably below the horizontal plane of the revoluble elements of the casters, so that the weight being supported at a point below the centers of the casters will render the device stable, and avoid all danger of accidental overturning when the truck is moved sidewise. The loading end of the platform is extended in the form of an inclined plane or skid 20′, and the extreme end of the portion 20′ is provided with a down-turned flange that is serrated or toothed, as indicated at 23, this toothed surface being normally at a point slightly above the level of the floor, while the truck is in normal position. During the loading and unloading, the forward end 20′ of the truck will be depressed, and the rear end will be tilted up, as indicated by dotted lines in Fig. 2, so that the teeth may be driven into the floor or other supporting surface with sufficient force to prevent sliding or slipping of the truck during the loading and unloading operations.

It is obvious that two casters may be employed at the rear end of the truck, in place of the single caster illustrated, and that the device may be used for the support and transportation of any articles, although, as before stated, it is intended principally for use in handling automobiles and other vehicles.

I claim:—

1. A truck having a single piece platform and side and rear supporting casters, the platform being dished longitudinally and transversely and inclining downward toward the front load receiving end, and the casters being wholly outside of the contour of the platform.

2. A truck having a single piece platform and side and rear casters, the platform being dished longitudinally and transversely with its upper edge above the plane of the tops of the caster wheels, and its bottom or load supporting portion below the plane of the axes of the caster wheels, the platform inclining downward toward the front load receiving end and the casters being wholly outside of the contour of the platform.

3. A truck having a single piece longitudinally and transversely dished platform and side and rear casters, said platform being provided near its upper edge with outwardly projecting ears to which the casters are swiveled, and also being provided with a forwardly and downwardly projecting skid portion which extends forwardly of a transverse line connecting the side casters.

4. In a truck, an integral single piece load supporting platform having projecting caster attaching ears, and a forwardly extended loading end provided with downwardly bent floor engaging spurs or teeth.

5. In a truck, a plurality of revoluble supports, and a single piece platform inclining downward toward the load receiving end and having integral outwardly extending ears at its upper edge for attachment to said supports, said platform being dished transversely and in the direction of its length, and the load supporting surface being in a horizontal plane below the horizontal plane of the axes of the supports.

6. In a truck, a load receiving platform dished longitudinally and concaved transversely to follow approximately the contour of a vehicle wheel, the platform being inclined downward toward the load receiving end, and revoluble supports on which the platform is mounted, the load sustaining surface of the platform being in a horizontal plane below the plane of the axes of said revoluble supports.

In testimony that I claim the foregoing as my own, I have hereto affixed my signature in the presence of two witnesses.

HERMAN WEBER.

Witnesses:
B. M. AITKEN,
FRANK F. CRUMP.